Jan. 15, 1957  W. GEISLER  2,777,411
METHOD OF MAKING LINED BOTTLE CAPS
Filed Feb. 16, 1954  2 Sheets-Sheet 1

Jan. 15, 1957 W. GEISLER 2,777,411
METHOD OF MAKING LINED BOTTLE CAPS
Filed Feb. 16, 1954 2 Sheets-Sheet 2

INVENTOR.
William Geisler
BY
Pennie, Edmonds, Morton, Barrows & Taylor

United States Patent Office 2,777,411
Patented Jan. 15, 1957

2,777,411

METHOD OF MAKING LINED BOTTLE CAPS

William Geisler, Tenafly, N. J., assignor to Wilbro Corporation, Maywood, N. J., a corporation of New Jersey Application February 16, 1954, Serial No. 410,584

2 Claims. (Cl. 113—80)

This invention relates to improvements in bottle caps and methods of making the same and has for its object to provide a bottle cap which will maintain a tight seal on bottles and cans containing fluids having a higher internal pressure than the conventional cork lined cap even though the pressure applied to the cap when applied to the bottle or can is no greater or even less than that employed with the cork lined cap.

A further object of the invention is to provide a cap which is especially adapted for sealing cans made of light metal and consequently unable to withstand the pressure of the cap applying machine to the same extent as a glass bottle. A can made of a light gauge metal having sufficient strength to hold a fluid with high internal pressure will not withstand the force required to compress an ordinary cork lined cap sufficiently for it to make a tight seal. With my improved cap a lighter pressure can be used and a satisfactory seal can be made with a tear strip type of cap which ordinarily can be employed only with fluids having low internal pressure.

A further object of my invention is to provide a method of making my improved cap whereby the cost of manufacture is greatly reduced.

In the accompanying drawings I have shown my improved cap and have also illustrated the successive steps employed in carrying out my improved method of manufacture and the apparatus used therein.

Referring to the drawings.

My improved cap consists essentially of a metal part of conventional design having a disk of rubber vulcanized to the inner face of the cap, the rubber being formed by an extrusion molding process and vulcanized to the sheet of metal out of which the cap is formed. After the disks are formed and vulcanized to the sheet, disks of metal with the caps centered therein are punched out of the sheet and at the same operation the margins of the disks are shaped to form the conventional crimped flange for gripping the neck of the bottle or can when applied by the usual capping machine.

Figure 1:
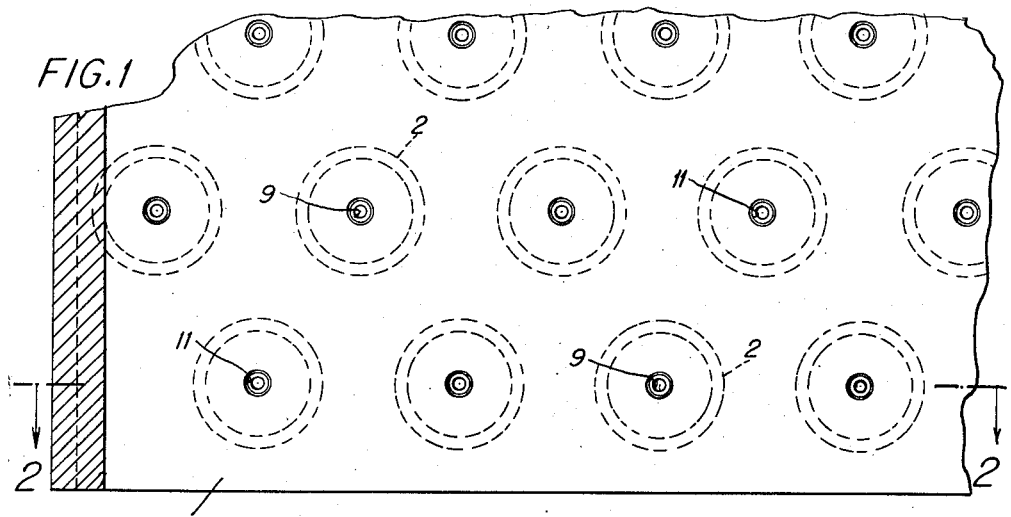
Fig. 1 is a plan view of the mold proper looking down on the stripper plate.
Figure 2:
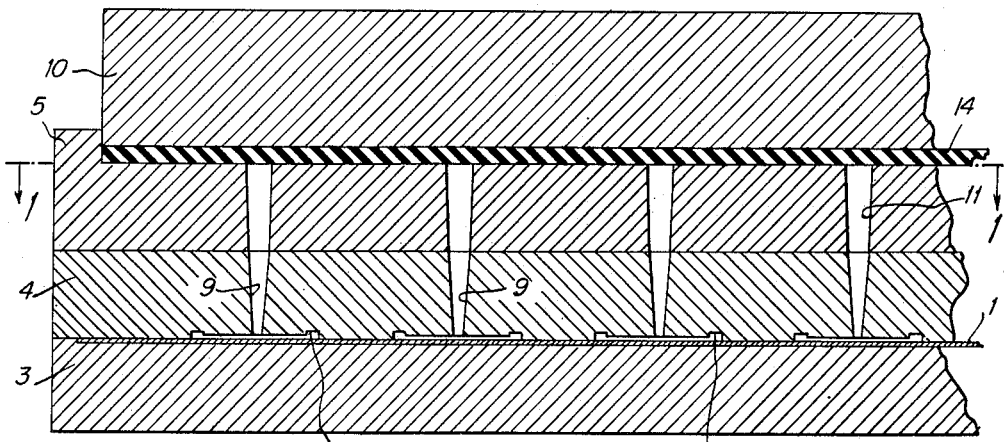
Fig. 2 is a sectional view through the mold and extruding apparatus on line 2—2 of Fig. 1.
Figure 3:
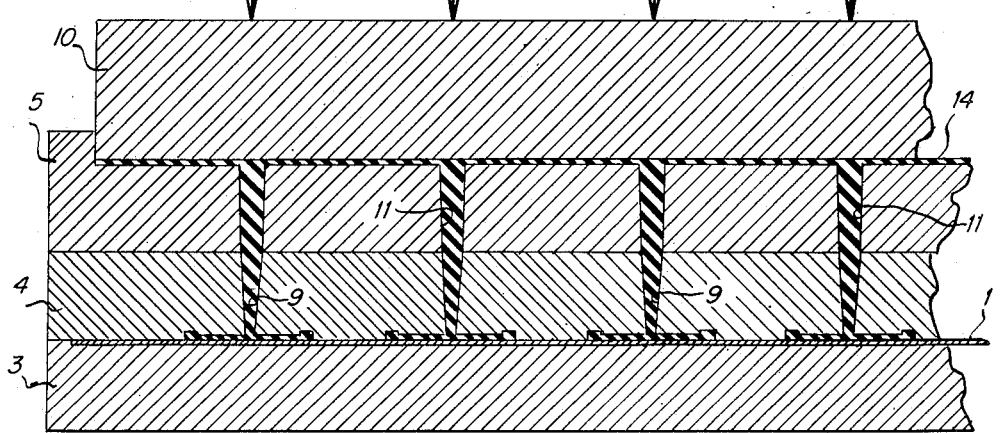
Fig. 3 is a similar view showing the flow of the rubber effected by the extrusion press.
Figure 4:
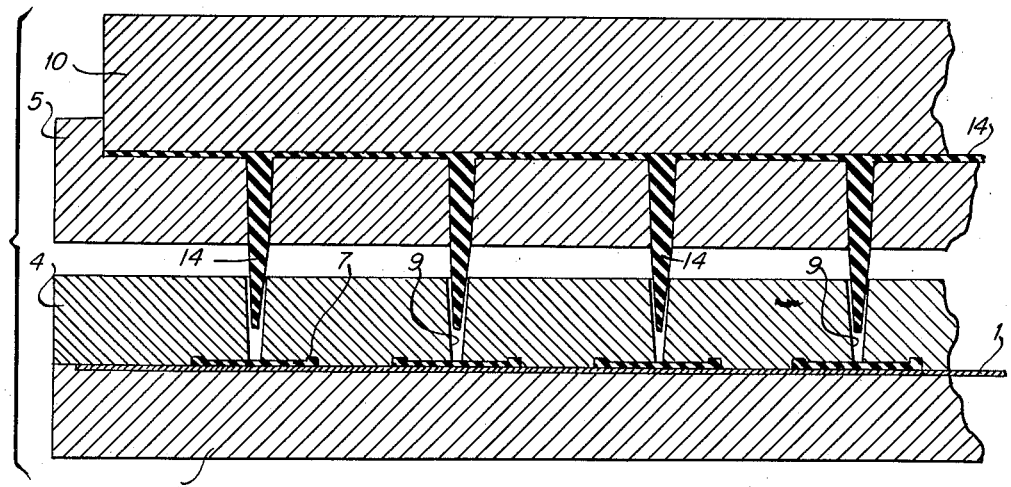
Fig. 4 is a similar view in the second position of operation.
Figure 5:
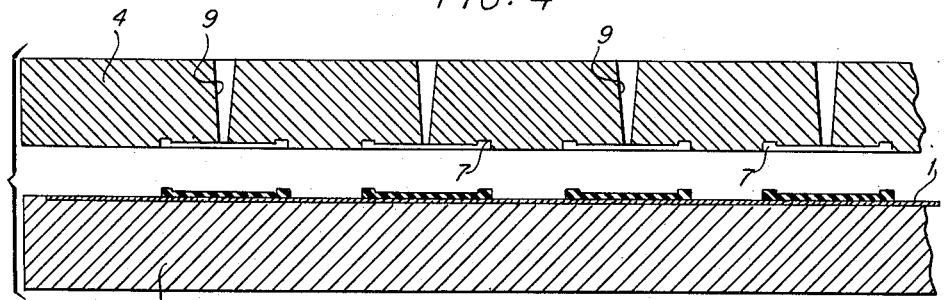
Fig. 5 is a similar view of the two bottom parts of the mold after the third step in the operation.
Figure 6:
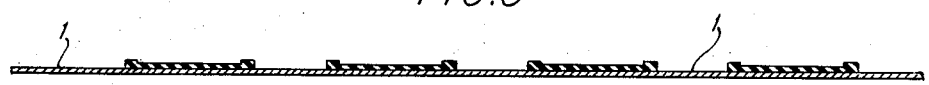
Fig. 6 is a sectional view of the sheet with the rubber disk vulcanized thereon.

In carrying out my improved method of manufacture a sheet of metal 1 (see Fig. 2), which may be of lighter gauge than required for the usual cork lined cap, is printed on one side with the legend or symbols to appear on the cap when applied to the bottle. The printed areas are indicated by the dotted circles 2 in Fig. 1.

The sheet so printed is placed in the bottom of the lower part 3 of a three part extrusion mold. The sheet is cut to the exact dimensions to fit in the mold so that the printed areas will be properly centered on the caps. The bottom part of the mold consists of a bottom wall with three upstanding flanges to position the sheet. The upper part of the mold consists of two flat plates 4 and 5. A series of recesses 7 are formed in the under side of the plate 4, said recesses being of the shape and size of the rubber disks to be molded. In the center of each recess is a hole 9 for the passage of the rubber into the recesses from the pressure chamber of the extrusion press consisting of the upper plate 5 and the overlying member 10. The holes 9 are tapered as shown, with the smaller diameter at the upper face of the plate 5. The plate 5 is provided with a series of holes 11 therein registering with the holes 9 in the plate 4. The holes 11 are also tapered but with the small diameters on the bottom so that the smallest diameter of the registering holes is at the bottom wall of the plate 4 overlying the recesses 7.

The rubber from which the disks are formed is supplied to the pressure chamber on the top face of the plate 5 in the form of a sheet 14. The sheet is unvulcanized and of a composition to flow under pressure through the registering holes 9 and 11 into the cavities 7.

In carrying out the molding operation the parts are assembled as shown and pressure is applied to the upper face of the part 10, thereby forcing the rubber compound through the registering holes 9 and 11 in the two plates 4 and 5 into the cavities 7 and into contact with the face of the sheet 1. The sheet 1 and the bottom section of the mold are heated to a vulcanizing temperature, so that the rubber disks as formed in the cavities 7 will be vulcanized and firmly stuck to the sheet 1.

The pressure member 10 is then lifted and with it the upper part 5 of the mold. The separation of the two sections 4 and 5 causes the strips of rubber in the registering holes 9 and 11 to break at the point of smallest diameter, thus leaving the upper face of the disks flat except for a minute central protuberance. After the disks are formed the part 10 is raised and the rubber sheet with the pending "tails" lifted out and a fresh sheet put in its place. The old sheet can be returned to the rubber mill so there is no waste.

The caps are formed from the sheet in a cap forming punch of ordinary construction except that its inner punch member which forces the cap through the forming die is shaped at its lower end to conform with the upper face of the rubber disk.

Figure 7:
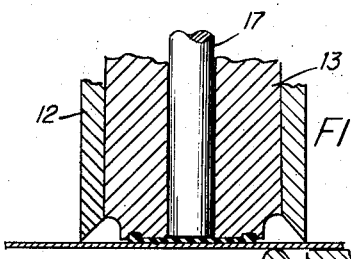
Figs. 7 and 8 are detail views showing the upper part of the cap forming press.
Figure 8:
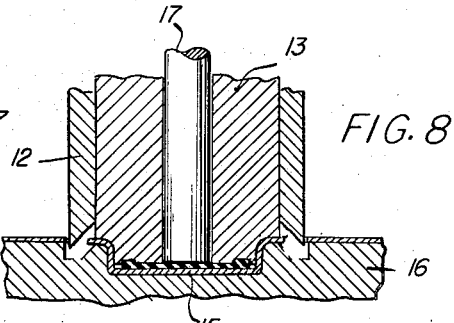
Figure 9:
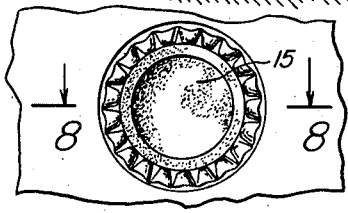
Fig. 9 is a plan view of the finished cap.

The upper and lower members of the shaping press are shown in Figs. 7 and 8 and comprise a sleeve 12 by which the disks are cut, and a shaping die 13 into which the disks are forced by the lower shaping die 16. An ejector 17 within the plunger serves in the usual manner to strip the cap 15 from the end of the plunger when it lifts the cap out of the mold. I have found that the rubber disks, when vulcanized, are soft enough to provide a good seal, but will nevertheless transmit the pressure of the die to the metal during the shaping of the cap without permanent deformation.

Instead of heating the plate 1 and the mold to vulcanizing temperature the vulcanizing may be performed as a separate step by transferring the sheet with the molded disks to the usual vulcanizing oven and then to the cap forming press. The molding compound, while plastic enough to be forced through the openings of the press into the molds, is still firm enough to retain its shape when the plate with the attached caps is removed from the mold.

While rubber is the preferred material for forming the gasket disks because of its superior gasket qualities, other synthetic compounds having the required physical characteristics may be employed.

In the foregoing specification I have described the preferred form of my improved bottle cap and the method as now employed in its manufacture. It will be understood, however, that the invention is not limited to the specific embodiments shown and described except insofar as recited in the accompanying claims.

I claim:

1. The method of making bottle caps which comprises interposing a sheet of metal between die members, one of said members having a plurality of accurately spaced circular cavities in the face contacting the sheet of metal and passages from said cavities through the die member to the opposite face, simultaneously filling said cavities through said passages with a molding compound of compressible gasket-forming material, detaching the material filling the cavities from the material in the passages while maintaining such material in the cavities in contact with the metal, cutting the metal sheet to form separate disks each with a piece of molded rubber attached thereto concentric with the disk and shaping the disk to form a bottle cap.

2. The method of making bottle caps which comprises interposing a sheet of metal between die members, one of said members having a plurality of accurately spaced circular cavities in the face contacting the sheet of metal and passages from said cavities through the die member to the opposite face, simultaneously filling said cavities through said passages with a vulcanizable rubber molding compound, vulcanizing the compound in the cavities while in contact with the metal sheet, detaching the rubber filling the cavities from the rubber in the passages while maintaining such material in the cavities in contact with the metal, cutting the metal sheet to form separate disks each with a piece of molded rubber attached thereto concentric with the disk and shaping the disk to form a bottle cap.

References Cited in the file of this patent
UNITED STATES PATENTS

| | | |
|---|---|---|
| 1,486,937 | Taliaferro | Mar. 18, 1924 |
| 1,610,295 | Latham | Dec. 14, 1926 |
| 1,832,321 | Owens | Nov. 17, 1931 |
| 2,456,615 | Berglund | Dec. 21, 1948 |
| 2,516,647 | Rogers | July 25, 1950 |
| 2,543,775 | Gora | Mar. 6, 1951 |
| 2,548,306 | Gora | Apr. 10, 1951 |
| 2,654,914 | Maier | Oct. 13, 1953 |